(12) United States Patent
Huang

(10) Patent No.: US 7,510,170 B2
(45) Date of Patent: Mar. 31, 2009

(54) HUMIDIFYING FAN

(75) Inventor: Chin-Cheng Huang, Tainan (TW)

(73) Assignee: Guan Hong Enterprise Co., Ltd., Tainan (TW)

( * ) Notice: Subject to any disclaimer, the term of this patent is extended or adjusted under 35 U.S.C. 154(b) by 356 days.

(21) Appl. No.: 11/558,341

(22) Filed: Nov. 9, 2006

(65) Prior Publication Data

US 2008/0111257 A1     May 15, 2008

(51) Int. Cl.
*B01F 3/04*     (2006.01)

(52) U.S. Cl. ............................. 261/28; 261/88; 261/89; 261/118

(58) Field of Classification Search .................... 261/28, 261/29, 36.1, 78.2, 84, 88, 89, 90, 91, 106, 261/115, 118, DIG. 3, DIG. 43
See application file for complete search history.

(56) References Cited

U.S. PATENT DOCUMENTS

| | | | | |
|---|---|---|---|---|
| 1,190,386 A | * | 7/1916 | Dickerson | 96/284 |
| 1,626,666 A | * | 5/1927 | Cramer et al. | 261/91 |
| 1,626,667 A | * | 5/1927 | Cramer et al. | 261/91 |
| 1,915,938 A | * | 6/1933 | Leftwich | 261/29 |
| 1,952,269 A | * | 3/1934 | Lundquist | 261/91 |
| 2,079,574 A | * | 5/1937 | Lea | 261/91 |
| 2,218,198 A | * | 10/1940 | Harris | 261/30 |
| 2,267,835 A | * | 12/1941 | Norris | 261/28 |
| 2,527,015 A | * | 10/1950 | Lhota | 261/91 |
| 2,537,833 A | * | 1/1951 | Joos | 261/28 |
| 2,631,830 A | * | 3/1953 | Carraway | 261/28 |
| 2,826,398 A | * | 3/1958 | Norris | 261/28 |
| 3,110,748 A | * | 11/1963 | Myklebust | 261/29 |
| 3,130,246 A | * | 4/1964 | Banks | 261/29 |
| 3,151,188 A | * | 9/1964 | Weatherston et al. | 261/29 |
| 3,188,007 A | * | 6/1965 | Myklebust | 239/215 |
| 3,220,707 A | * | 11/1965 | Weatherston et al. | 261/22 |
| 3,283,478 A | * | 11/1966 | Briggin et al. | 96/284 |
| 3,290,021 A | * | 12/1966 | Blachly et al. | 261/29 |
| 3,294,376 A | * | 12/1966 | Eranosian | 261/29 |
| 3,365,181 A | * | 1/1968 | Schwaneke | 261/130 |
| 3,914,349 A | * | 10/1975 | Stipanuk | 261/29 |

FOREIGN PATENT DOCUMENTS

| | | | |
|---|---|---|---|
| JP | 58-195727 | * | 11/1983 |
| TW | 489949 | | 6/2002 |
| TW | 510446 | | 11/2002 |
| TW | 532433 | | 5/2003 |
| TW | M261612 | | 4/2005 |
| TW | M294578 | | 7/2006 |

\* cited by examiner

*Primary Examiner*—Scott Bushey
(74) *Attorney, Agent, or Firm*—J.C. Patents

(57) ABSTRACT

A humidifying fan includes a base, a water swinging device and a fan device. The base has a water tank for storing an appropriate amount of water or other liquids, and an atomized water hole. The water swinging device has a power element and a water swinging fan connected with a suction tube extending in the water tank and having slots in its inner wall and plural water exits. When water is sucked up to spray through the exits, it is dispersed by the swinging fan to get atomized. But, a large number of droplets without atomized are to attach on a fur comb set around the swinging fan and then drop in the water tank. The fan device consisting of blades and power element is to blow and spread the atomized water for cooling air.

7 Claims, 8 Drawing Sheets

HUMIDIFYING FAN

BACKGROUND OF THE INVENTION

1. Field of the Invention

This invention relates to a humidifying fan, A particularly to one able to blow air blended with atomized vapor to lower the air temperature in a room. The invention is composed of a base, a water swinging device and a fan device. The base is provided with a water tank for storing water or other liquids. The water swinging device installed above the water tank is provided with a water swinging fan driven by a power element, and a suction tube set under the water swinging fan for sucking the water or the liquids in the water tank to eject out of water exits. Next, the atomized vapor ejected out of the water exits is to be blown by the water swinging fan to shoot out through a water-spraying hole of the water tank and then, blown further by the fan device to spread widely in the air to lower the air temperature.

2. Description of the Prior Art

There are some conventional cooling fans to be described below.

A portable cooling fan disclosed in a Taiwan patent No. 095203912, defined as a first prior art, includes a front cover installed with a driving device inside it via a positioning bar. The front of the driving device is installed with blades to carry out blowing while the driving device is turned on. The driving device is covered with a cooling unit at its outer side, which is successively covered by a rear cover. As the driving device is turned on, air is to be blown to pass through the cooling unit that is filled with coolant to cool down the air, enabling a user to put himself in a cool space any time and any where. But, it can only works effectively in a small space.

Another cooling fan with atomized vapor disclosed in a Taiwan patent No. 093209424, defined as a second prior art, includes a main frame, a water supply device and a fan. The water supply device possesses a filter to filtrate the water in a water tank. The water after being filtrated is transferred by a pump to an annular tube of the fan through a connecting tube, and sprayed out from a nozzle of the annular tube to get atomized, and then, further blown by the fan to spread widely in the air for heat exchange, effective to lower the temperature and keep a certain relative humidity. But, its defects are a big size, its water tank to be separated from its fan to become a weird appearance and a pump needed to suck the water in the water tank to form a complicated structure.

An air-purified cooling fan disclosed in a Taiwan patent No. 091206399, defined as a third prior art, includes a first cooling nest and a second cooling nest spaced apart properly in an air entry chamber of a main box. The space confined by the two cooling nests is to form a cooling space fully installed with a water exit tube provided with a plural spraying nozzles connected at its proper positions for atomizing water to fill the cooling space and the two cooling nests. Therefore, the air is sucked in to make a primary heat exchange through the first cooling nest, and next, to be purified and cooled further by the atomized vapor in the cooling space, and then, to let water condensed on the second cooling nest to blow out of the fan, so as to obtain a cleaned cool air. But, the quality of the water cannot be kept stable as the spraying nozzles may become abnormal after functioning a period of time.

An ultra-sonic cooling fan disclosed in a Taiwan patent No. 090217102, defined as a fourth prior art, includes a main frame set inside with a water tank, which is installed with an air sucking hole, a low-level sensor and a buoying ultra-sonic probe inside it. A motor and blades of a fan are fitted in front of the top of the water tank. In using, the water tank is first filled with water to a proper level, so that the buoying ultra-sonic probe can suspended by a floating plate to float upon the water surface and start atomizing water via ultra sonic when the water level is sensed to be higher than the low level by a low-level sensor. The atomized vapor suspending above the water surface is then carried out by the air sucked in from the air sucking hole and blown out of the fan. The defects are that the ultra-sonic device is expensive and has a complicated structure.

A cooling fan with atomized vapor disclosed in a Taiwan patent No. 090213461, defined as a fifth prior art, includes a shell set with a blowing device at its front side and a filter set at its rear side. There is a water sprayer installed between the blowing device and the filter, used to spray water sucked from a water tank set at the bottom of the shell for cooling down the air blown. The defect is that the water sprayer cannot atomize water satisfactorily.

SUMMARY OF THE INVENTION

The objective of this invention is to offer a humidifying fan able to blow air blended with a certain amount of moisture to lower temperature in a room, keeping a user feel comfortable.

The main characteristics of the invention are described as follows.

1. A water tank of a base is stored with a proper amount of water or other liquids and provided with a water-spraying hole.

2. A water swinging device consists of a power element and a water swinging fan fixed with an axis of the power element and connected with a suction tube that has spiral slots dug in its inner wall and is extended into the water tank.

3. When the water in the water tank is sucked up by the suction tube and swung out through water exits to get atomized by the water swinging device, a large portion of the droplets atomized poorly are to attach on a fur comb set around the water swinging fan and then drop in the water tank, and the well-atomized vapor is to shoot out through the water-spraying hole and blown to spread in the air by a fan device.

4. The fan device consists of a front cover, a rear cover, blades installed in the front cover and a power element set inside the rear cover functioning to blow air blended with the atomized vapor for reducing the air temperature.

BRIEF DESCRIPTION OF DRAWINGS

This invention is better understood by referring to the accompanying drawings, wherein.

DETAILED DESCRIPTION OF THE PREFERRED EMBODIMENT

Figure 1:
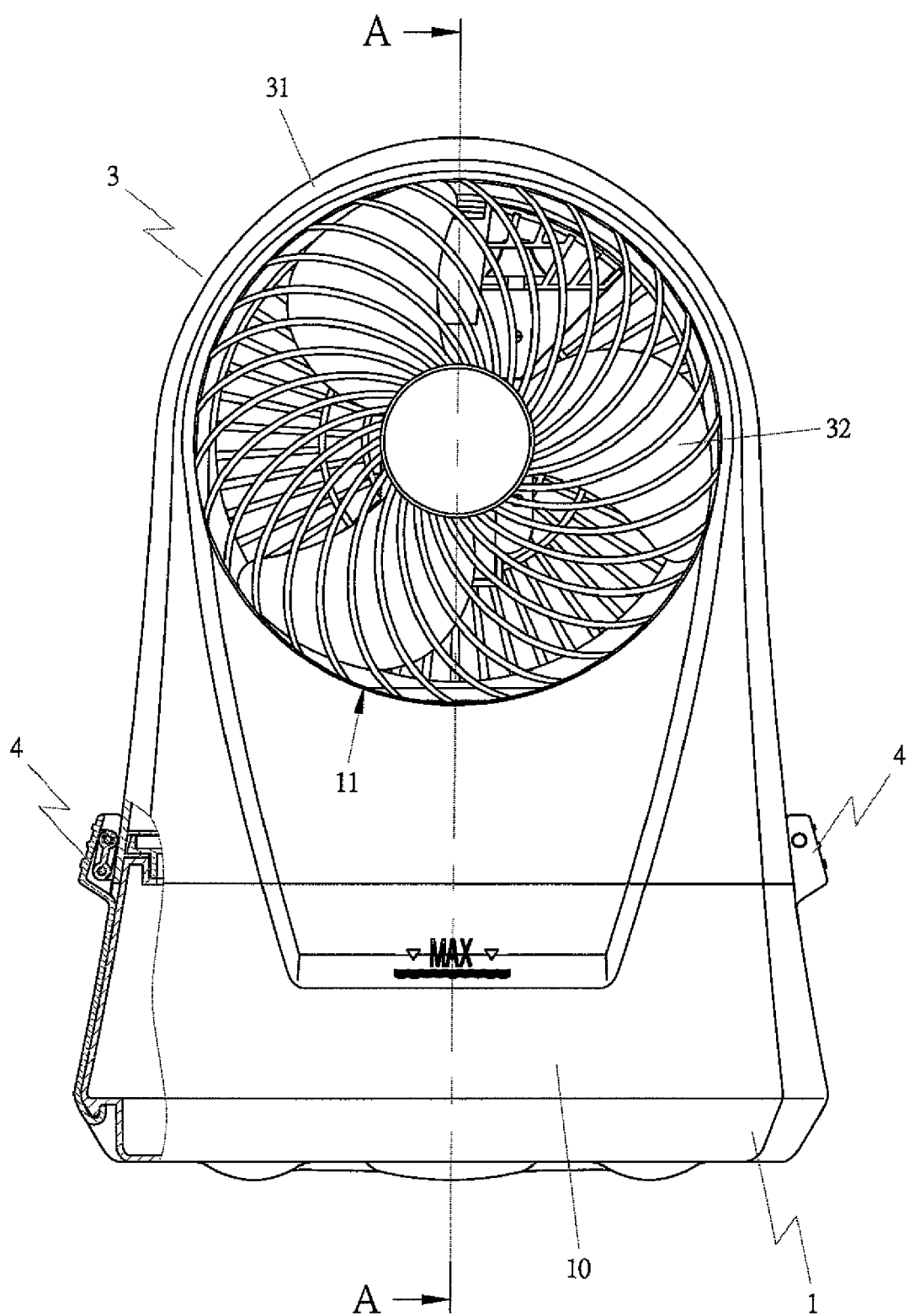
FIG. 1 is a perspective view of a preferred embodiment of a humidifying fan in the present invention.
Figure 2:
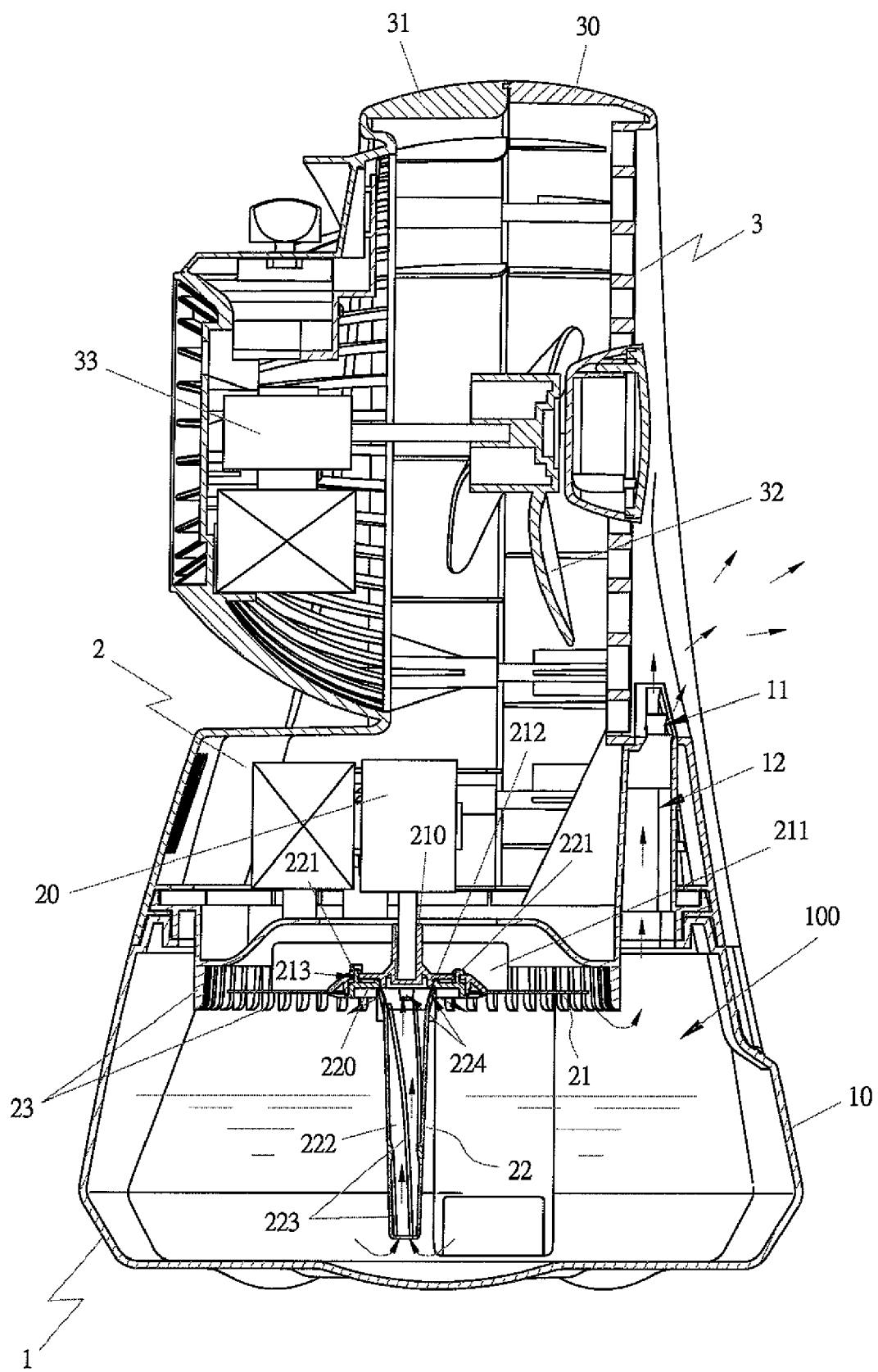
FIG. 2 is a cross-sectional view of the "A-A" line in FIG. 1.

As shown in FIGS. 1 and 2, a preferred embodiment of a humidifying fan in the present invention includes at least a base 1, a water swinging device 2 and a fan device 3.

The base 1 is provided with a water tank 10 having a capacity depending on the size of a humidifying fan, for storing an appropriate amount of water or other liquids. The water tank 10 has an empty space 100 formed in its upper portion and provided with a water-spraying hole 11 connected with the water tank 10 through a passage 12.

Figure 3:
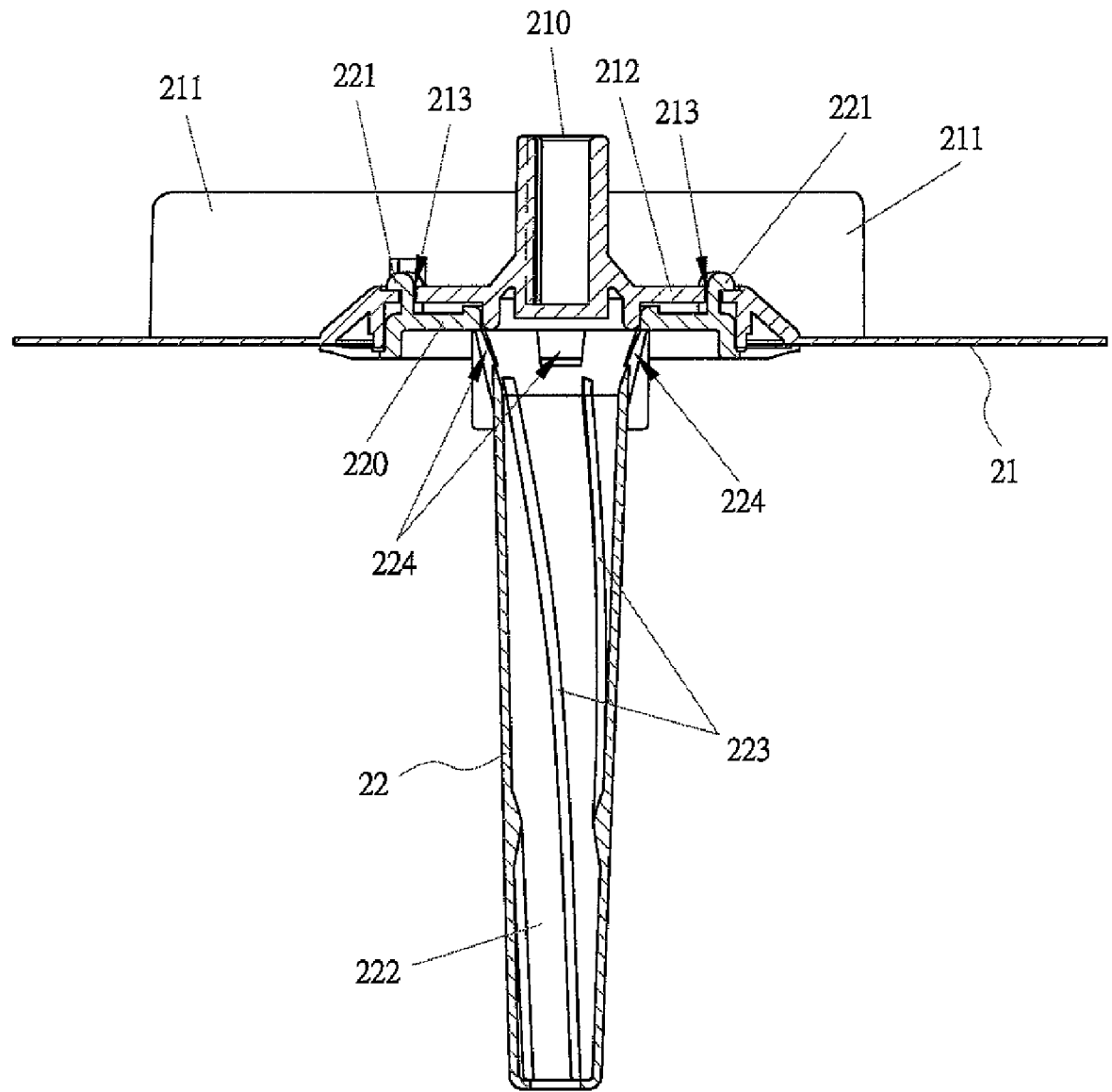
FIG. 3 is a cross-sectional view of a water swinging fan and a suction tube assembled together in the present invention.
Figure 4:
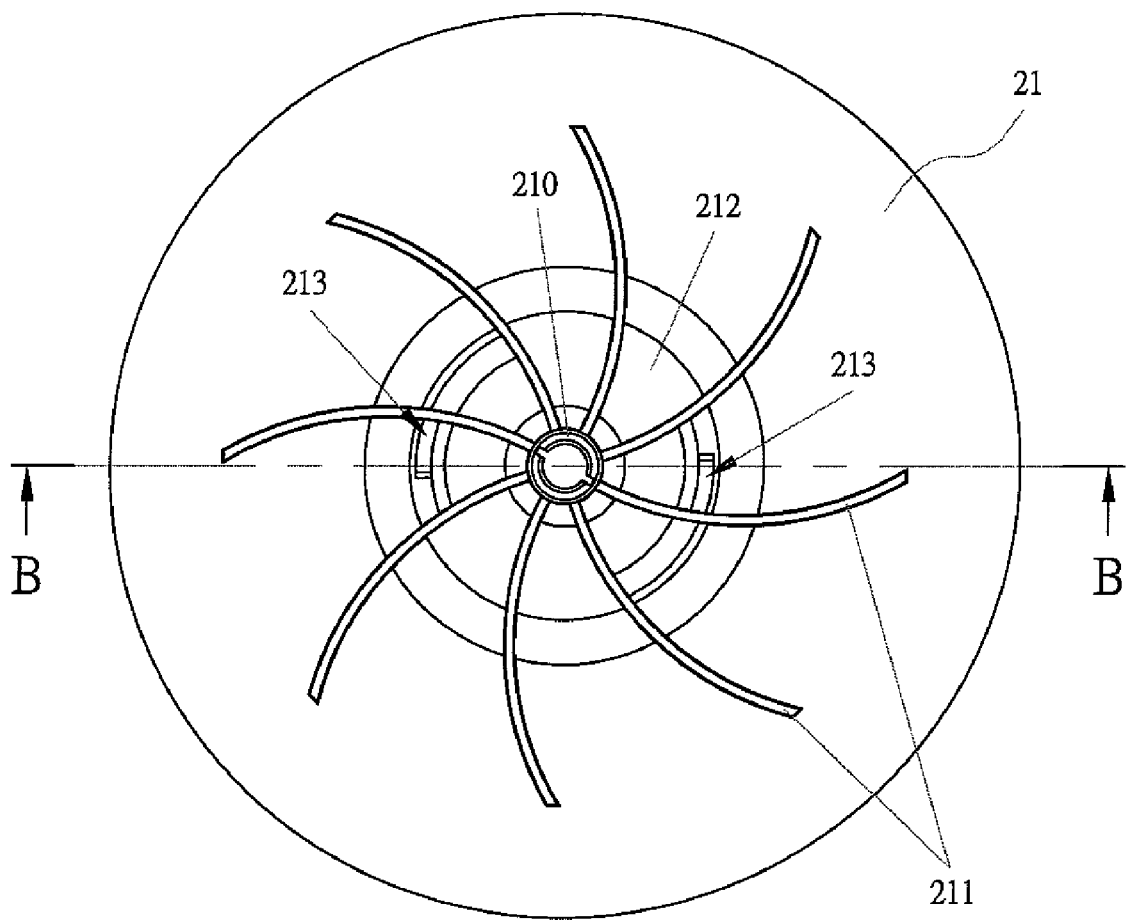
FIG. 4 is a top view of the water swinging fan in the present invention.
Figure 5:
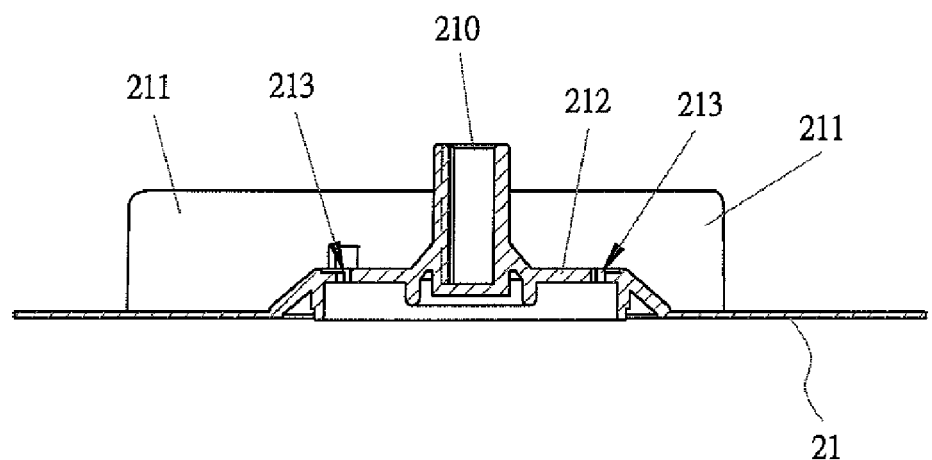
FIG. 5 is a cross-sectional view of the "B-B" line in FIG. 4.
Figure 6:
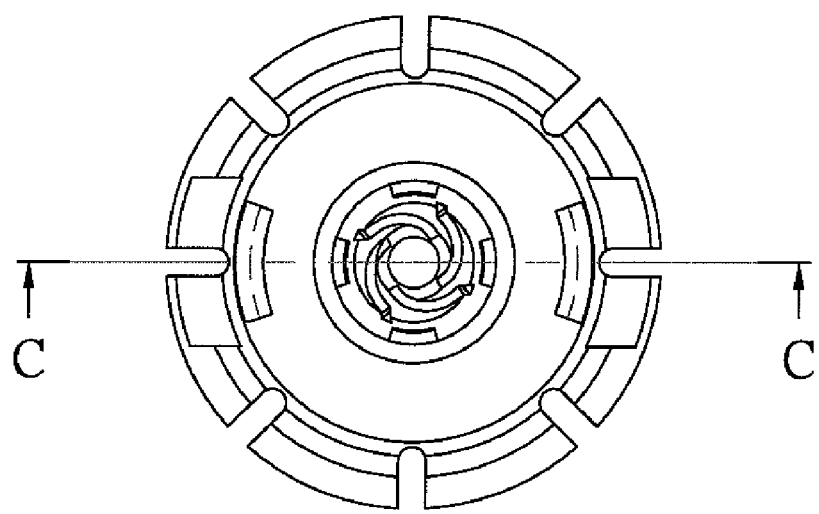
FIG. 6 is a front view of the suction tube in the present invention.
Figure 7:
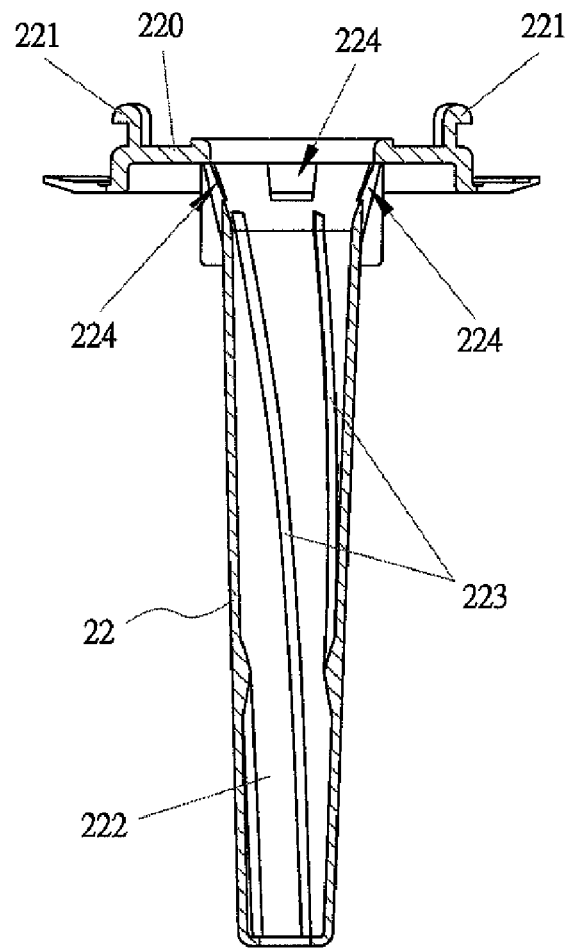
FIG. 7 is a cross-sectional view of the "C-C" line in FIG. 6.
Figure 8:
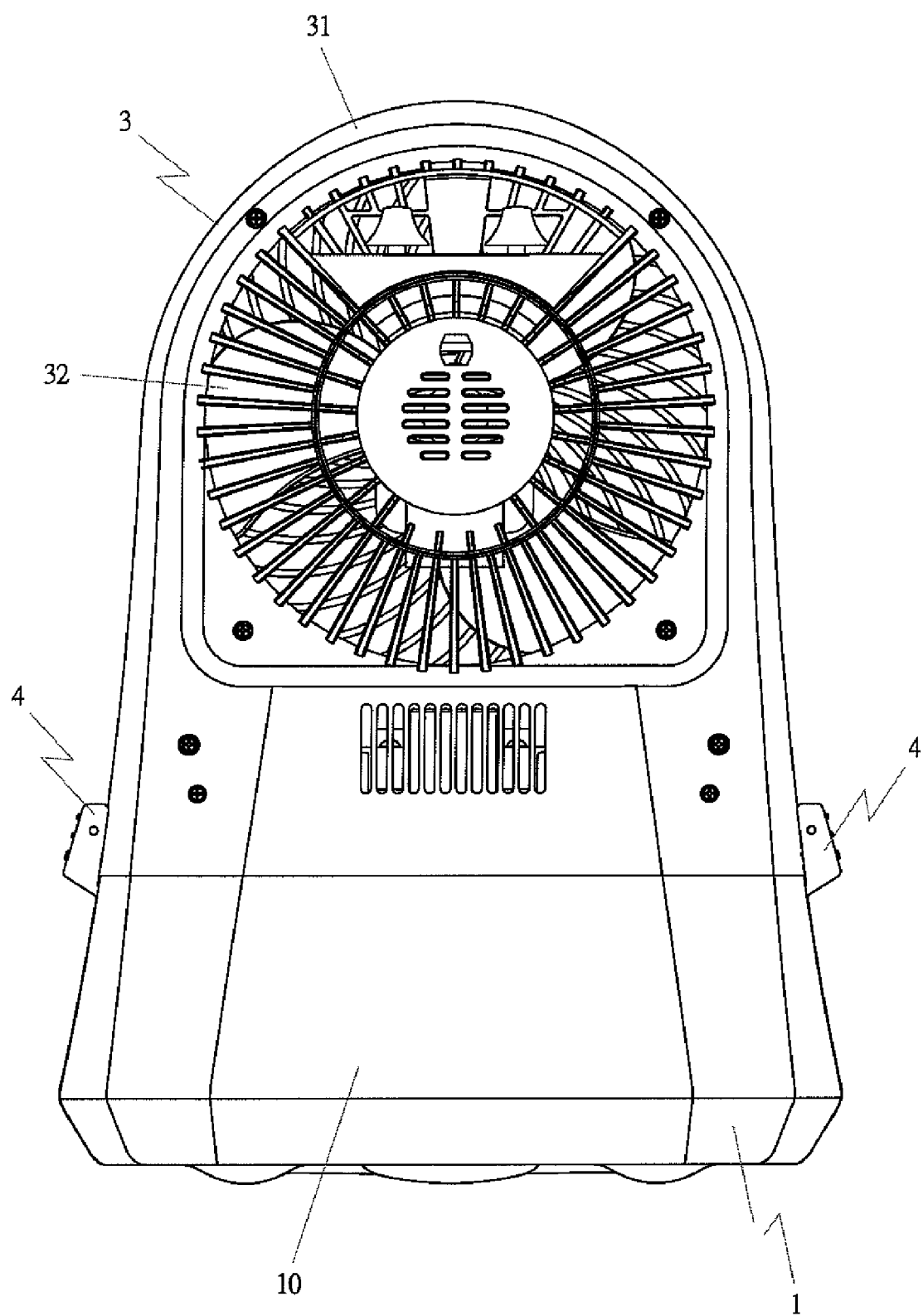
FIG. 8 is a front view of the preferred embodiment of a humidifying fan in the present invention.
Figure 9:
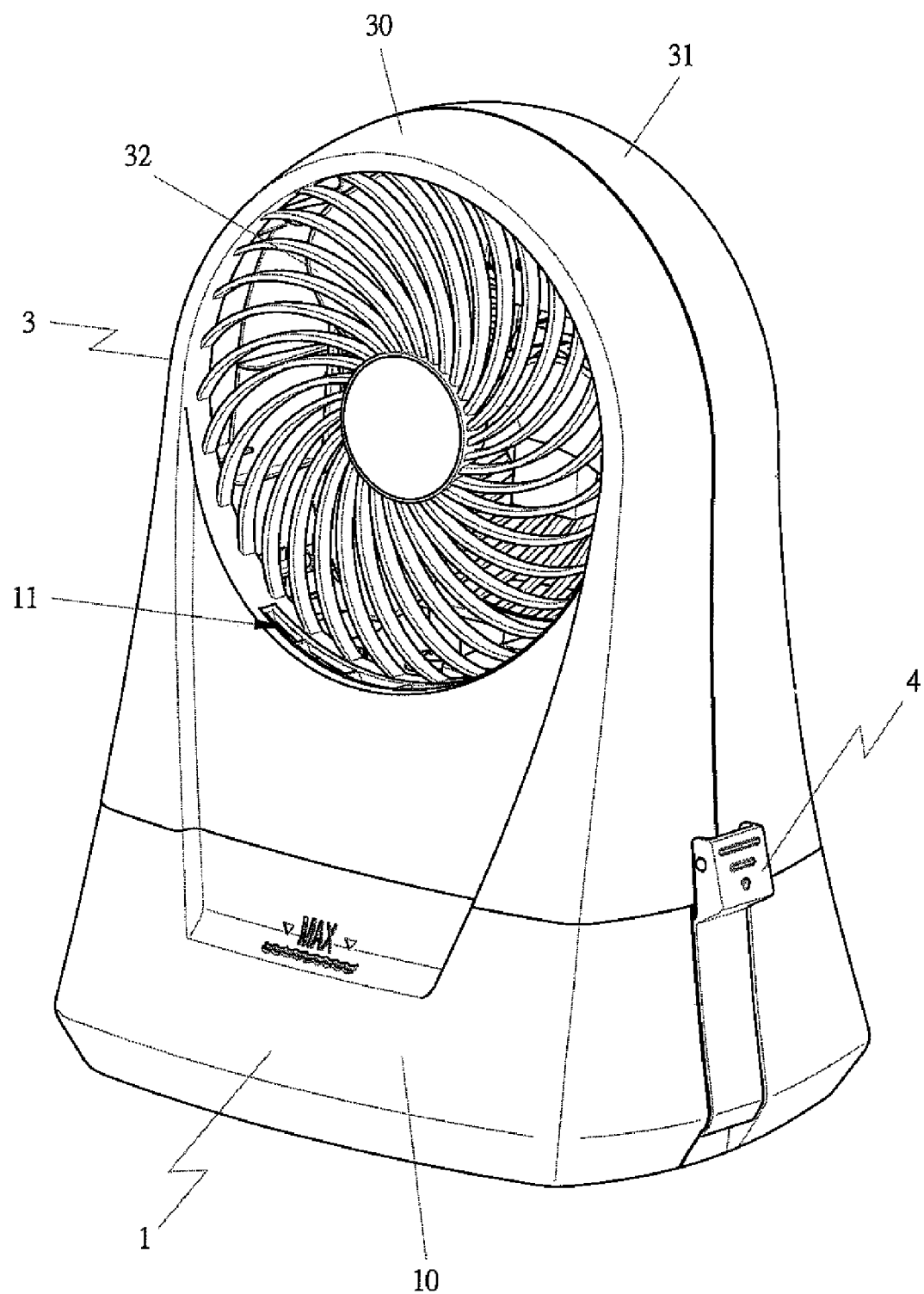
FIG. 9 is a rear perspective view of the preferred embodiment of a humidifying fan in the present invention.
Figure 10:
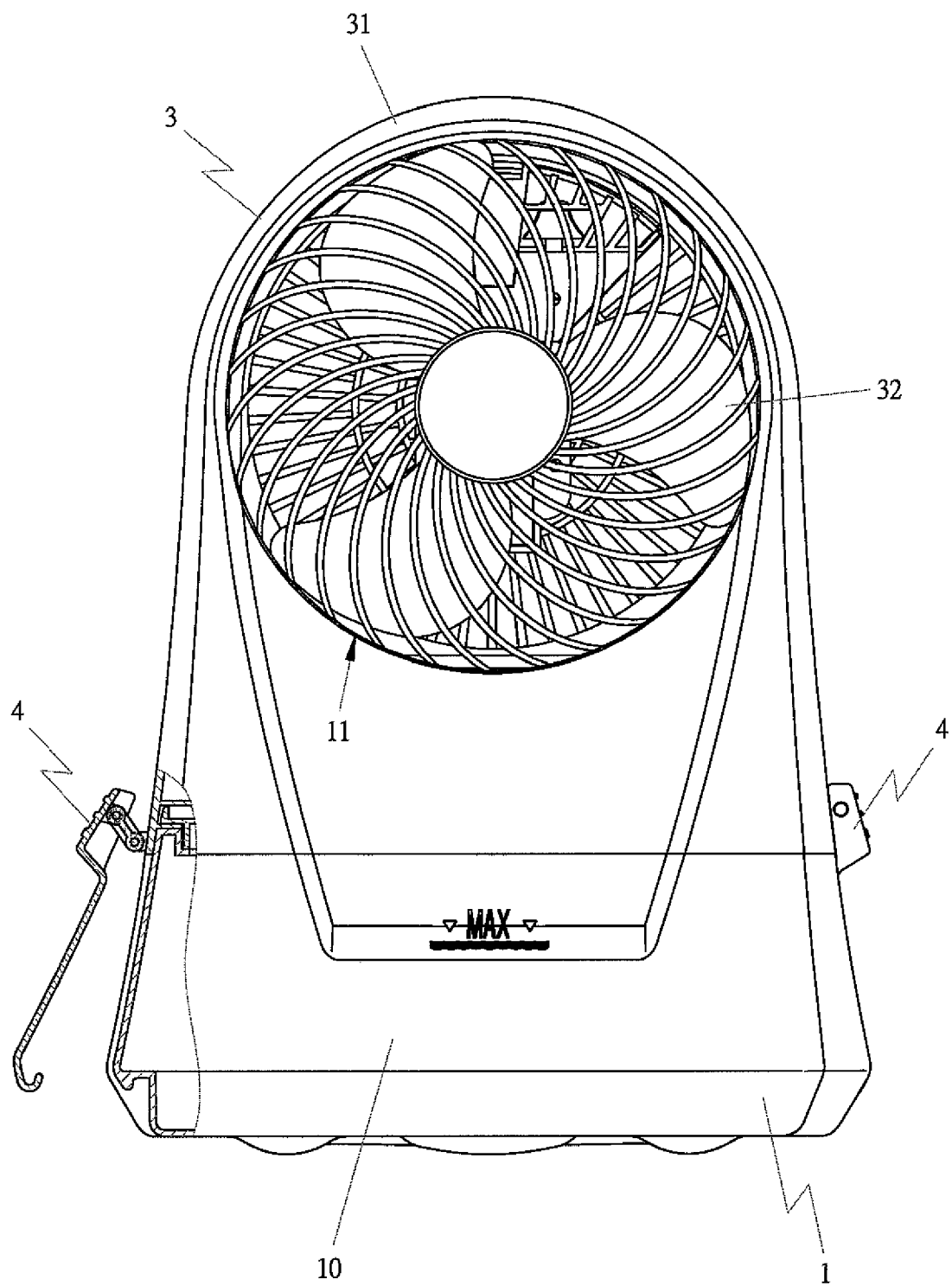
FIG. 10 is a front view of the preferred embodiment of a humidifying fan in the present invention.

The water swinging device 2 is composed of a power element 20, a water swinging fan 21, a suction tube 22 and a fur comb 23. The power element 20 is preferably a motor, but can also be other rotary power elements. The water swinging fan 21 installed in the empty space 100 of the water tank 10 is fixed with the axis of the power element 20 by its axial base 210 and provided with plural spiral blades 211, shown in FIGS. 3 and 4, and a fixing base 212 set under the axial base 210. There are plural holes 213 dug on the fixing base 212 to position the suction tube 22 under the water swinging fan 21, shown in FIGS. 6 and 7. The suction tube 22 consists of a fixing base 220 set at its top, which is provided with plural hooking elements 221 for fitting in the holes 213 of the fixing base 212 of the water swinging blade 21 so as to keep the suction tube 22 fixed with the water swinging fan 21, as shown in FIGS. 3 and 4, enabling the suction tube 22 to simultaneously rotate with the water swinging fan 21. In addition, the suction tube 22 is provided with plural spiral slots 223 (available for an odd or even number) dug on its inner wall 222, and plural water exits 224, and extended into the water tank 10 for sucking the water in it. When the water swinging fan 21 is driven to rotate by the power element 20, the suction tube 22 is also to start rotating, enabling the water sucked from the water tank 10 to flow along the spiral slots 223 to spray out of the water exits 224 and then, be blown away by the water swinging fan 21. And, a large portion of the spread water is to be stopped to attach on the fur comb 23 and then, drop back into the water tank 10, with some lighter atomized vapor float away the water swinging fan 21 to enter into the air through the water-spraying hole 11.

The fan device 3 is provided with a front cover 30, a rear cover 31 fixed together with the front cover 30 by conventional screws, blades 32 set in the front cover 30 and a power element 33 installed in the rear cover 31 for driving the blades 32. In addition, a locking member 4 is positioned among the front cover 30, the rear cover 31 and the base 1, enabling the front cover 30 and the rear cover 31 hooked fixedly by the locking member 4. If water needs to be re-filled, just directly unlock the locking member 4 to fill in water.

In using, as the water swinging device 2 is turned on, the well-atomized vapor is to float out of the water-spraying hole 11 and then, be blown to spread among the air by the fan device 3, keeping air cooled down.

While the preferred embodiment of the invention has been described above, it will be recognized and understood that various modifications may be made therein and the appended claims are intended to cover all such modifications that may fall within the spirit and scope of the invention.

What is claimed is:

1. A humidifying fan comprising:
   a base consisting of a water tank provided with a water-spraying hole;
   a water swinging device composed of a power element, a water swinging fan, a suction tube and a fur comb, said water swinging fan provided with an axial base fixed with an axis of said power element, spiral blades and a fixing base, said fixing base having plural holes for combining with said suction tube, said suction tube possessing a fixing base formed in an upper portion and provided with plural hooking elements for fitting in said holes of said fixing base of said water swinging fan so as to keep said suction tube combined tightly with said water swinging fan, said suction tube additionally dug with plural spiral slots on its inner wall and having plural water exits and extending into said water tank, said fur comb set around said water swinging fan; and
   a fan device provided with a front cover and a rear cover, said front cover installed with plural blades, said rear cover set with a power element to drive said blades to whirl for blowing air.

2. A humidifying fan as claimed in claim 1, wherein said water tank is formed with some empty space in its upper portion.

3. A humidifying fan as claimed in claim 1, wherein a passage is set between said water-spraying hole and said water tank of said base.

4. A humidifying fan as claimed in claim 1, wherein said water swinging fan of said water swinging device is installed in said empty space of water tank.

5. A humidifying fan as claimed in claim 1, wherein the number of said spiral slots of said suction tube is odd or even.

6. A humidifying fan as claimed in claim 1, wherein said fur comb is used for droplets to attach on and to let lighter atomized vapor shoot out of said water-spraying hole to spread around in air.

7. A humidifying fan as claimed in claim 1, wherein a locking member is positioned among the front cover, the rear cover and the base so as to enable said front cover and said rear cover hooked fixedly by it.

* * * * *